United States Patent [19]

Shichijo et al.

[11] Patent Number: 5,000,511
[45] Date of Patent: Mar. 19, 1991

[54] APPARATUS FOR ATTACHING A DISPLAY MONITOR TO A SEAT

[75] Inventors: Hajime Shichijo, Kanagawa; Toshio Kimura, Saitama; Masato Kaji, Gifu, all of Japan

[73] Assignees: Sony Corporation, Tokyo; Tenryu Industries Co., Ltd., Gifu, both of Japan

[21] Appl. No.: 432,984

[22] Filed: Nov. 7, 1989

[30] Foreign Application Priority Data

Nov. 8, 1988 [JP] Japan ............................ 63-145868[U]

[51] Int. Cl.⁵ ............................................... A47C 7/62
[52] U.S. Cl. ..................................... 297/191; 297/117
[58] Field of Search ............... 297/191, 112, 113, 114, 297/115, 116, 117, 146; 273/85 G, DIG. 28, 148 B

[56] References Cited

U.S. PATENT DOCUMENTS

| | | | |
|---|---|---|---|
| 2,098,426 | 11/1937 | McDonald | 297/191 X |
| 2,652,101 | 9/1953 | Samsky et al. | 297/114 |
| 3,168,346 | 2/1965 | Rei | 297/117 X |
| 4,311,461 | 1/1982 | Hotta | 297/191 X |
| 4,630,821 | 12/1986 | Greenwald | 297/191 X |
| 4,647,980 | 3/1987 | Stevenson et al. | 358/254 |
| 4,703,972 | 11/1987 | Omberg | 297/191 X |
| 4,711,488 | 12/1987 | Ohanessian | 297/191 X |
| 4,756,528 | 7/1988 | Umashankar | 273/1 E |

FOREIGN PATENT DOCUMENTS

| | | |
|---|---|---|
| 54-105499 | 7/1979 | Japan . |
| 57-199369 | 12/1982 | Japan . |
| 63-15676 | 2/1988 | Japan . |
| 63-128844 | 8/1988 | Japan . |
| 63-128845 | 8/1988 | Japan . |

OTHER PUBLICATIONS

Proceedings of the SCAR Conference, NASA CP-001, Part 2, Held at Langley Research Center, Hampton, Va., Nov. 9-12, 1976, excerpts entitled, "Outside Viewing," and Passenger Evacuation.
"Putting the Future of Passenger Services and Entertainment at Your Fingertips," Boeing Electronics Company, Seattle, Wash.

Primary Examiner—Laurie K. Cranmer
Attorney, Agent, or Firm—Philip M. Shaw, Jr.

[57] ABSTRACT

A display is attached to a reclining seat back by an arm pivotally fixed at a first end thereof to the seat back with the display being attached to the second end of the arm by a pivot mechanism having multiple degrees of freedom, and wherein a recess for stowing the display is formed in the seat back either on its side, its top or behind the head rest.

16 Claims, 6 Drawing Sheets

APPARATUS FOR ATTACHING A DISPLAY MONITOR TO A SEAT

BACKGROUND OF THE INVENTION

1. Field of the Invention

The present invention relates generally to display attaching apparatus and, more particularly, is directed to a seat to which is attached a display monitor suitable for application to passenger seats of aircraft, railroad cars and buses to enable passengers to watch video programs on the display monitor.

2. Description of the Prior Art

Recently, low-power type display apparatus such as liquid crystal display-type television monitors and the like have been mass-produced, thus becoming less expensive. This technical progress promotes the development of a seat apparatus for attaching a display monitor in which the display monitors are provided on passenger seats of aircraft, railroad cars and buses so that individual passengers can view video programs and so on.

The prior-art seat apparatus for attaching a display monitor are roughly classified to provide the following two types: (A) a display monitor is attached to the seat back of the passenger seat just in front of the passenger who wants to watch a video program; and (B) a display monitor is mounted inside of an armrest of each passenger seat.

According to the seat apparatus of type A, when the seat back is reclined, the display monitor becomes difficult to see because the distance between the passenger and the display monitor is increased by the reclining amount of the seat back. Further, the distance between control switches and the display monitor is also increased and the interconnection therebetween is made complicated.

The seat apparatus of type B limits the space of the accommodating portion in which accessory apparatus such as a tray for meals, ash tray and various kinds of control switches are accommodated. Furthermore, there is the disadvantage that the seat apparatus of type B disturbs the entrance and exit of passenger in the adjacent passenger seat.

OBJECTS AND SUMMARY OF THE INVENTION

Accordingly, it is an object of the present invention to provide an improved seat apparatus for attaching a display monitor which can eliminate the above-mentioned defects encountered with the prior art.

More specifically, it is another object of the present invention to provide a seat apparatus for attaching a display monitor in which the display monitor can be accommodated without disturbing accessory apparatus provided on the seat and the adjacent seat and an armrest.

It is still another object of the present invention to provide a seat apparatus for attaching a display monitor in which the display monitor can be maintained at the optimum viewing position so that the display monitor becomes easy to view.

It is still another object of the present invention to provide a seat apparatus for attaching a display monitor in which the viewing angle of the display monitor can be changed properly in accordance with the position of the passenger.

According to an aspect of the present invention, there is provided a seat apparatus for attaching a display to a reclining seat having a seat back, wherein the apparatus comprises:

(a) arm means having a first end and a second end, with the first end being pivotally fixed to the seat back;

(b) display means attached to the second end of the arm means; and (c) wherein a recess for stowing the display means is formed in the seat back.

According to another aspect of the present invention, there is provided a seat apparatus for attaching a display to a pair of side-by-side reclining seats each having a seat back, wherein the apparatus comprises:

(a) a pair of arm means each having a first end pivotally fixed at one end thereof to a different one of the opposing sides of the seat backs;

(b) a pair of display means attached to the second ends of the pair of arm means, respectively; and (c) wherein a recess is formed in each of the opposing sides of the seat backs.

These and other objects, features and advantages of the present invention will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

A seat apparatus for attaching a display monitor according to a first embodiment of the present invention will hereinafter be described with reference to FIGS. 1 to 3.

Figure 1:
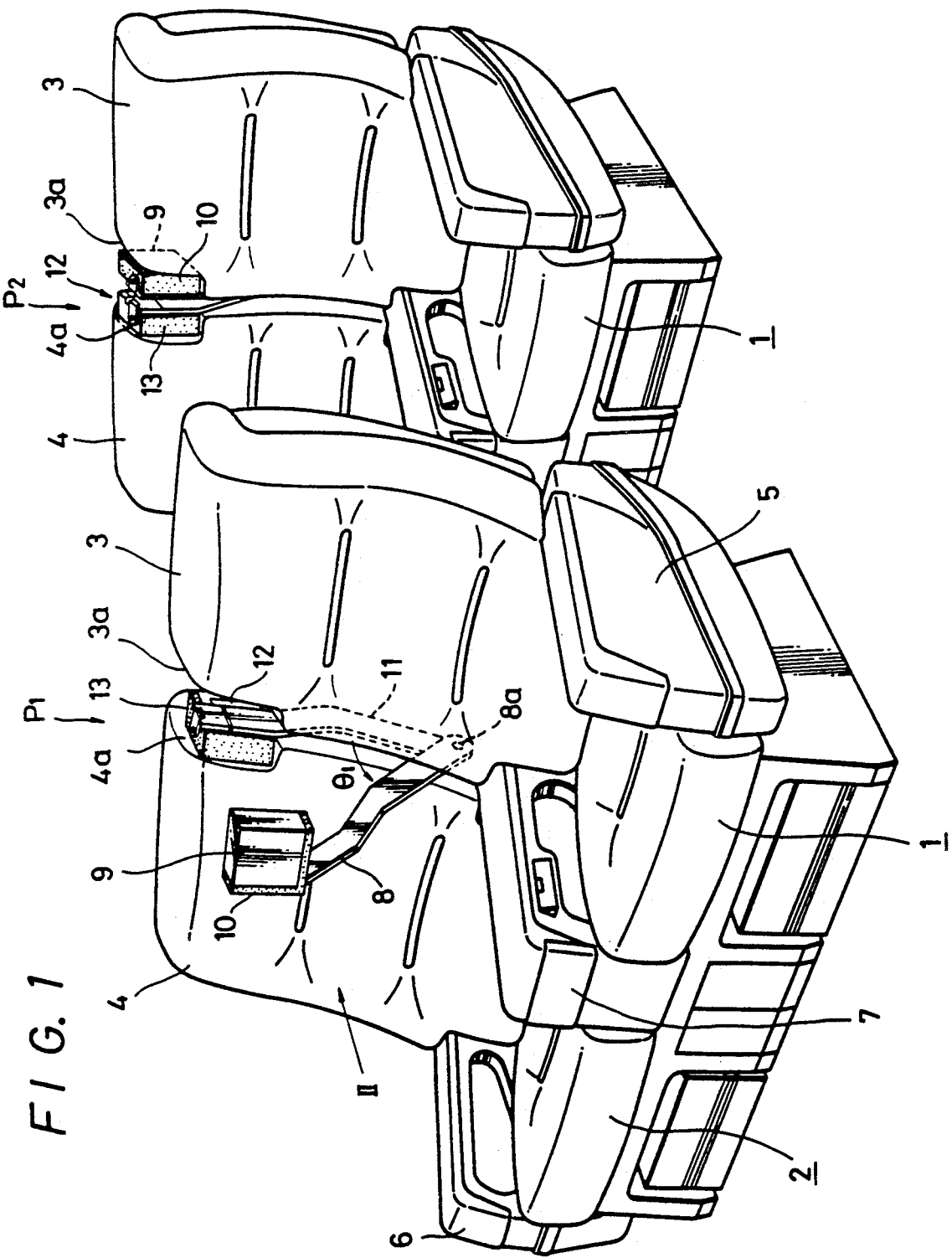
FIG. 1 is a perspective view illustrating a seat apparatus for attaching a display monitor according to a first embodiment of the present invention.

FIG. 1 pictorially illustrates a seat apparatus according to the first embodiment of the present invention in which a pair of seat apparatus are located at each of the positions P1 and P2, respectively. It will be seen in FIG. 1 that the side-by-side reclining passenger seats 1 and 2 are provided with reclineable seat backs 3 and 4 and arm rests 5 and 6. The arm rests 5 and 6 are attached to the respective sides of the reclining seats 1 and 2. A common arm rest 7 is provided to partition these reclining seats 1 and 2. An arm 8 is pivotally fixed through a shaft 8a provided at a first end of the arm 8 to the side of the right seat back 3 in the vicinity of the border of the arm rest 7 so that the arm 8 is made rotatable around the shaft 8a. A display monitor 9 is attached to the second, opposite end of the arm 8. The display monitor 9 can be a liquid crystal display monitor or a flat picture tube. A shock-absorbing member 10 is bonded to adjacent two side walls of the display monitor 9. The shock-absorbing member 10 is made of a resilient material such as a synthetic rubber and a synthetic fiber.

This display monitor 9 is connected to an operation panel (not shown) provided on the arm rest 7. The display monitor 9 has a video signal input terminal (not shown) which is connected to a signal line distributed from a video signal supply line (not shown) wired inside of the floor on which the reclining seats 1 and 2 are installed. Alternatively, the display monitor 9 itself can incorporate a tuner and the like.

As will be described in greater detail hereinafter, the display monitor 9 together with the shock-absorbing member 10 is rotatably mounted on the second end of the arm 8. A recess 3a is formed in the top of the side of the seat back 3 so that, when the arm 8 is rotated around the shaft 8a, the display monitor 9 is stowed in the recess 3a. When the display monitor 9 is stowed in the recess 3a, the shock-absorbing member 10 is exposed to the outer surface side of the seat back 3 as shown at the position P2 of FIG. 1. Another recess 4a is formed in the left seat back 4 at its position symmetrical to the recess 3a. Another display monitor 12 is similarly attached to an arm 11 which is pivotally fixed through a shaft (not shown) to the side wall of the seat back 4 on which the recess 4a is provided. A shock-absorbing member 13 is also bonded to adjacent two side walls of the display monitor 12. Accordingly, this display monitor 12 is stowed in the recess 4a so as to oppose the display monitor 9.

Figure 2A:
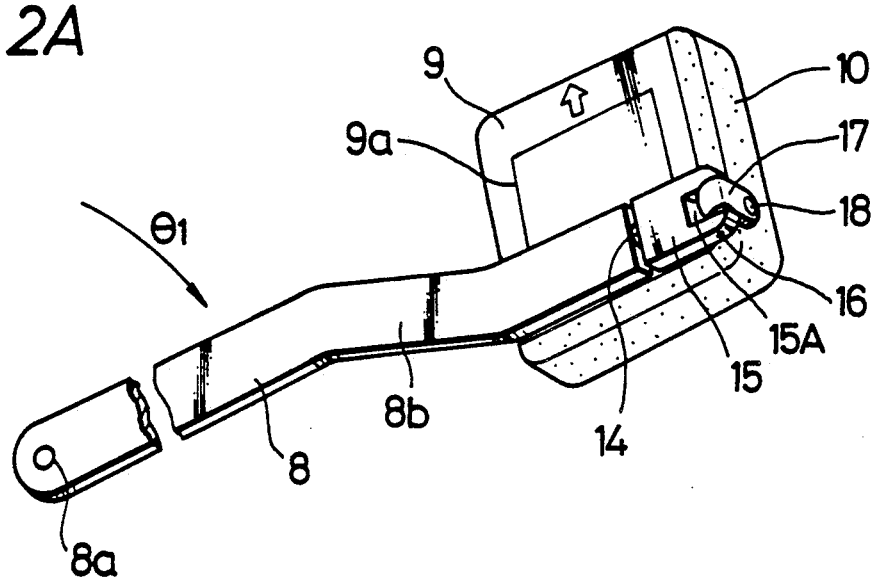
FIGS. 2A–2C are enlarged, perspective views of a main component of the seat apparatus according to the first embodiment, and which illustrate the main component along the direction shown by an arrow II of FIG. 1.

The coupling condition between the display monitor 9 and the arm 8 will be explained with reference to FIGS. 2A-2C, each of which is an enlarged, perspective view illustrating a main component of the seat apparatus of the first embodiment along the direction II of FIG. 1. The portion near the second end of the arm 8 is curved toward the passenger side, and a joint 15 is pivotally fixed at a first end thereof to the second end of the arm 8 through a shaft 14 so that the joint 15 can freely rotate in the direction shown by $\Theta_3$ in FIG. 2C.

Figure 2B:
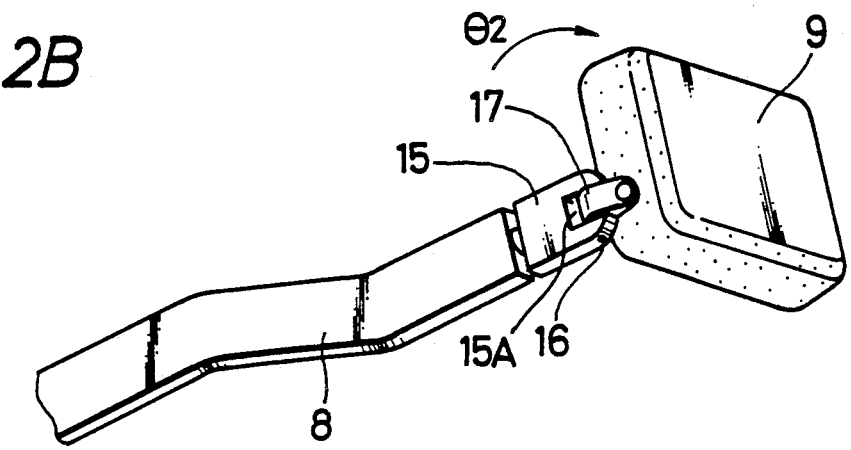
Figure 2C:
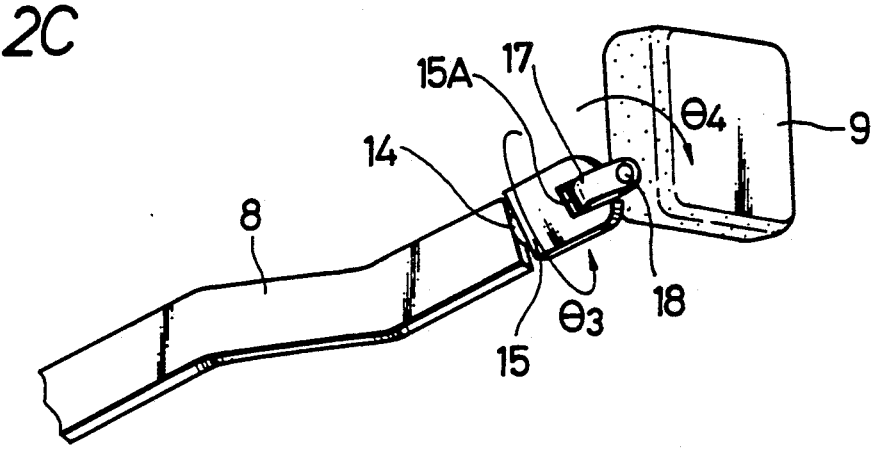

An attaching member 17 is pivotally fixed at a first end thereof to a shaft 16 inserted across a forked member 15A provided at the second end of the joint 15 in such a manner that the attaching member 17 can freely rotate in the direction shown by $\Theta_2$ in FIG. 2B around the shaft 16. The display monitor 9 is attached through its shock-absorbing member 10 to the second end of the attaching member 17 by a shaft 18.

According to the seat apparatus for attaching a display monitor of this embodiment, when the display monitors 9 and 12 are not used, the display monitors 9 and 12 can be stowed in the recesses 3a and 4a of the seat backs 3 and 4 as shown at the position P2 of FIG. 1. Thus, the display monitors 9 and 12 are not allowed to disturb accessory apparatus, etc. mounted on the arm rests 5, 6 and 7 of the two adjacent reclining seats 1 and 2.

Further, according to this embodiment, the shock-absorbing members 10 and 13 are respectively bonded to the display monitors 9 and 12 so that, when the display monitors 9 and 12 are stowed in the recesses 3a and 4a, the passengers can be protected from injury to their heads. Friction between a side surface of the monitor and the upper surface of the recess 3a prevents the monitor from coming down. Alternatively, a simple lock means could be provided (not shown).

When the passenger operates the display monitor 9, the passenger touches the shock-absorbing member 10 and turns the arm 8 around the shaft 8a in the direction shown by $\Theta_1$ in FIG. 2A, thereby withdrawing the display monitor 9 from the recess 3a. Then, the passenger holds the display monitor 9 and turns the attaching member 17 around the shaft 16 of the joint 15 in the direction shown by $\Theta_2$ in FIG. 2B, thereby turning a display 9a of the display monitor 9 toward the passenger side. In the next step, the passenger turns the display monitor 9 around the shaft 18 in the direction shown by $\Theta_4$ in FIG. 2C so that the display monitor 9 can be placed at its proper position in which the passenger can watch the video program in the best viewing position. The display monitor 9 is stabilized because of friction between the shaft 14 and the joint 15, the joint 15 and the attaching member 17, and the shaft 18 and the monitor 9.

According to this embodiment, the arm 8 and the display monitor 9 pivotally engage each other with three freedoms ($\Theta_2$, $\Theta_3$ and $\Theta_4$) whereby the passenger can place the display monitor 9 at the optimum viewing position in accordance with the figure.

Figure 3:
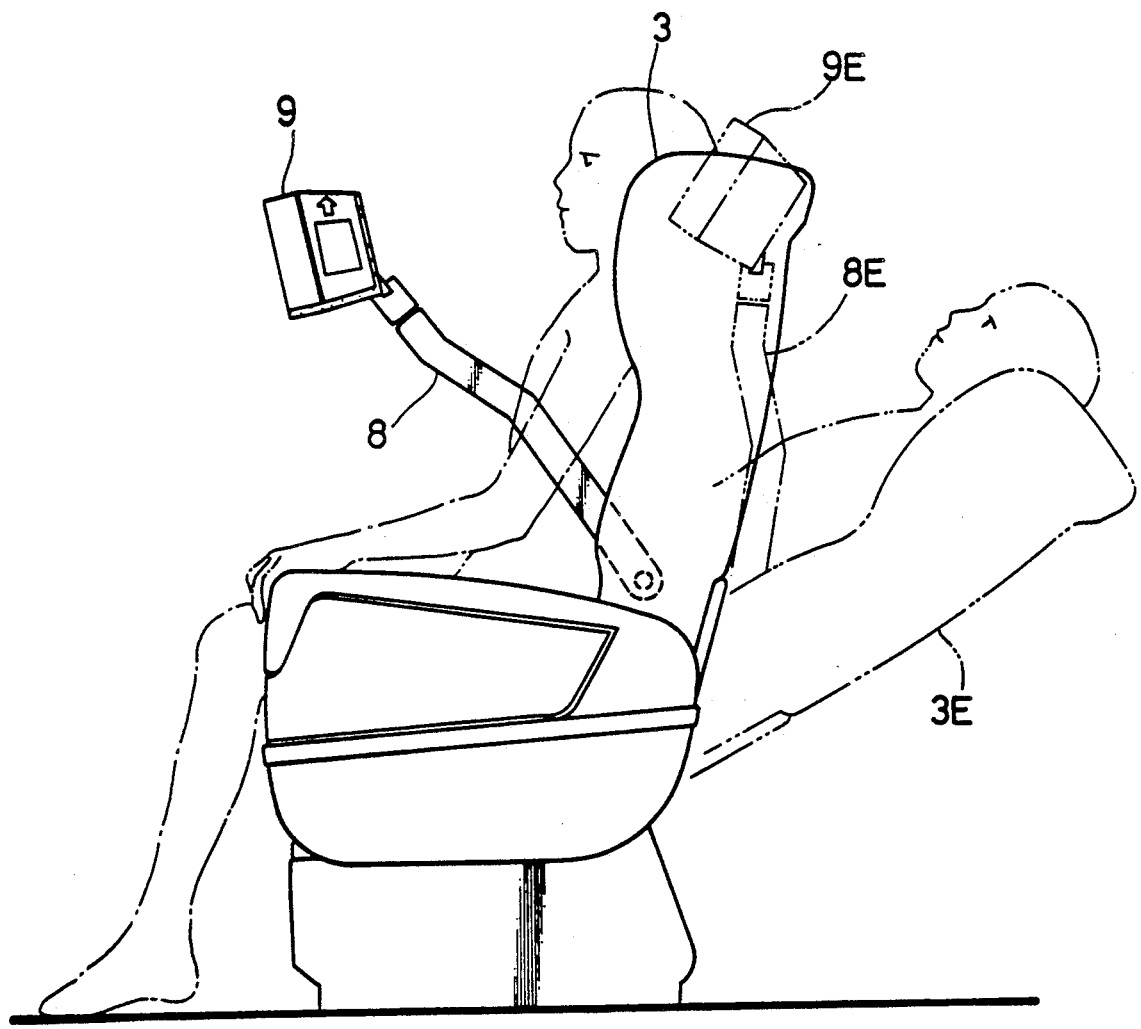
FIG. 3 is fragmentary, pictorial side view of FIG. 1, and to which reference will be made in explaining the operation of the seat apparatus according to the first embodiment of the present invention.

When the display monitor 9 is operated by the passenger in the example of FIG. 1, if the seat back 3 is reclined to the position shown by a two-dot chain line 3E in FIG. 3, then the display monitor 9 is also rotated through the arm 8 together with the seat back 3, whereby the arm 8 and the display monitor 9 are displaced as shown by two-dot chain lines 8E and 9E in FIG. 3. Thus, even when the seat back 3 is reclined, the display monitor 9 can be always kept at the optimum viewing position in which the passenger can watch the video program in the best viewing position.

Figure 4:
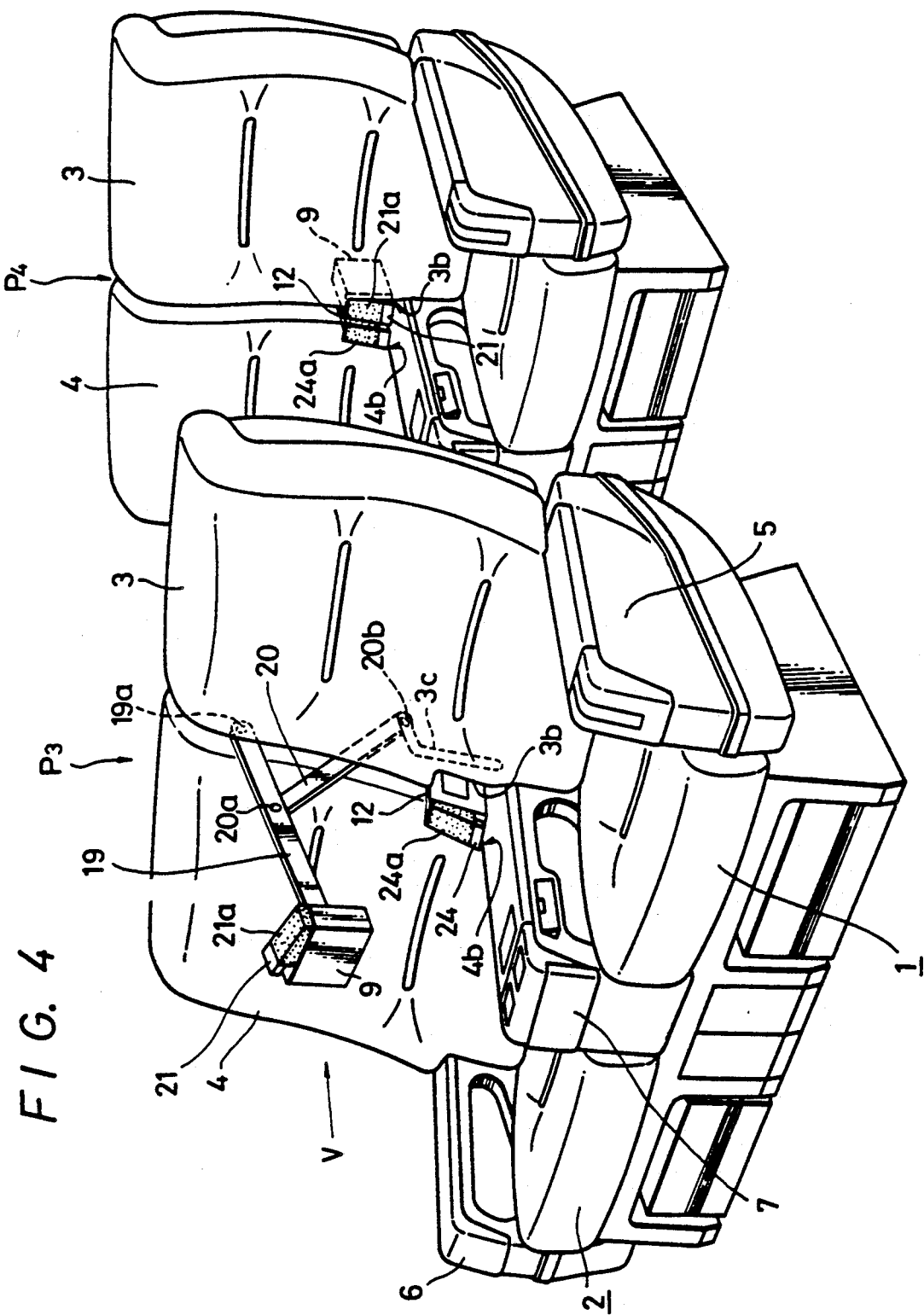
FIG. 4 is a perspective view illustrating a seat apparatus for attaching a display monitor according to a second embodiment of the present invention.

A second embodiment of the present invention will be explained with reference to FIGS. 4 and 5. In FIGS. 4 and 5, like parts corresponding to those of FIGS. 1 and 2 are marked with the same references and therefore need not be described in detail.

FIG. 4 illustrates a second embodiment of the present invention in which a pair of seat apparatus for attaching display monitors are located at positions P3 and P4, respectively. Referring to FIG. 4, it will be seen that an arm 19 is pivotally fixed at a first end thereof to an upper end of the side of the right reclineable seat back 3 adjacent to the seat back 4 through a shaft 19a so that the arm 19 can rotate around the shaft 19a. The display monitor 9 is pivotally attached to the second end of the arm 19. A stay 20 is pivotally fixed at a first end 20a thereof to the intermediate portion of the arm 19, and a pin 20b is implanted on the second end of the stay 20. The pin 20b is inserted into a guide groove 3c of an inverted L-letter shape formed in the side wall of the seat back 3. The pin 20b of the stay 20 is engaged with the short leg at the upper end of the guide groove 3c so that it is prevented from being dropped down in the direction toward the floor of the cabin.

A handle 21 is fixed to the side wall of the display monitor 9 through a shock-absorbing member 21a, and a recess 3b is formed in the side of the seat back 3 in the vicinity of the arm rest 7. When the engagement between the pin 20b of the stay 20 and the protrusion of the guide groove 3c is released and the pin 20b is slidably moved downward along the guide groove 3c, the display monitor 9 is stowed in the recess 3b. In this case, the shock-absorbing member 21a and the handle 21 are exposed to the outer surface side of the seat back 3 as shown at the position P4 of FIG. 4.

A recess 4b is similarly formed in the left seat back 4 at the position corresponding to the recess 3b of the right seat back 3. An arm and a stay (not shown) are similarly fixed to the side of the seat back 4 on which the recess 4b is formed. The display monitor 12 is pivotally fixed to the top of the arm and a handle 24 is fixed to the side of the display monitor 12 through a shock-absorbing member 24a. Accordingly, the display monitor 12 can be stowed in the recess 4b so as to oppose the display monitor 9.

The coupling condition between the arm 19 and the display monitor 9 will be explained with reference to FIGS. 5A–5C. Each of FIGS. 5A–5C is an enlarged, perspective view of a main component of the seat apparatus of this embodiment, and which illustrates the same along the direction V of FIG. 4.

Figure 5A:
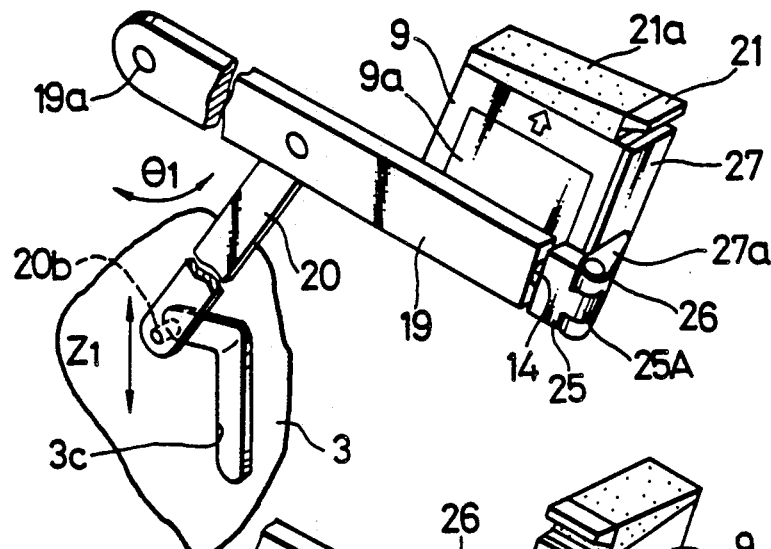
FIGS. 5A–5C enlarged, perspective views of a main component of the seat apparatus according to the second embodiment, and which illustrate the main component along the direction shown by an arrow V of FIG. 4.
Figure 5B:
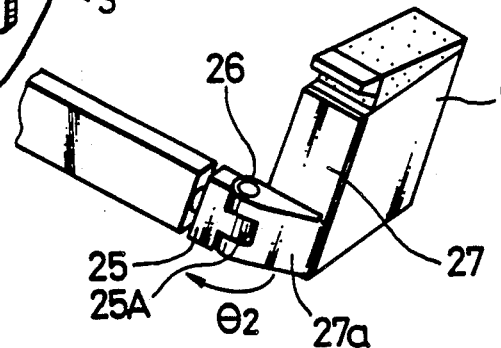
Figure 5C:
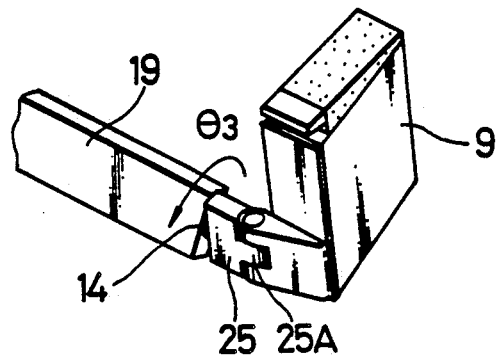

A joint 25 is pivotally fixed at a first end thereof to the second end of the arm 19 through the shaft 14 so that it can rotate around the shaft 14 in the direction shown by $\Theta_3$ in FIG. 5C. An engaging portion 27a of a side plate 27 is pivotally fixed through a shaft 26 to a fork 25A at the second end of the joint 25 so that it can rotate around the shaft 26 in the direction shown by $\Theta_2$ in FIG. 5B. The display monitor 9 is fixed to the side plate 27.

When the display monitor 9 is operated by use of the seat apparatus of this embodiment of FIG. 4, the passenger touches the handle 21 of the display monitor 9 located at the position P4 in FIG. 4 and turns the arm 19 around the shaft 19a in the direction shown by $\Theta_1$ in FIG. 5A. Then, the pin 20b of the stay 20 is slidably lifted within the guide groove 3c in the $Z_1$ direction (see FIG. 5A), engaged with the short leg of the upper end of the guide groove 3c and is stopped at that position. Thereafter, the passenger turns the display monitor 9 around the shaft 26 provided at the second end of the joint 25 in the direction shown by $\Theta_2$ in FIG. 5B so that the display 9a of the display monitor 9 can be opposed to the passenger. Finally, when the passenger turns the joint 25 around the shaft 14 provided at the second end of the arm 19 in the direction shown by $\Theta_3$ in FIG. 5C, the viewing angle of the display monitor 9 is determined properly so that the passenger can watch the display 9a of the display monitor 9 in the best viewing position.

According to the embodiment of FIG. 4, the display monitor 9 is provided with the handle 21 so that the passenger can withdraw the display monitor 9 from the recess 3b with ease. Further, the display monitor 9 and the arm 19 are rotatably coupled to each other with two freedoms ($\Theta_2$ and $\Theta_3$) so that the passenger can adjust the viewing angle of the display monitor 9 to be optimum by the simplified arrangement.

Furthermore, due to the stay 20 provided in the second embodiment of FIG. 4, the seat apparatus for attaching a display monitor allows a large-sized and heavy display monitor 9 to be attached to the seat back.

Figure 7:
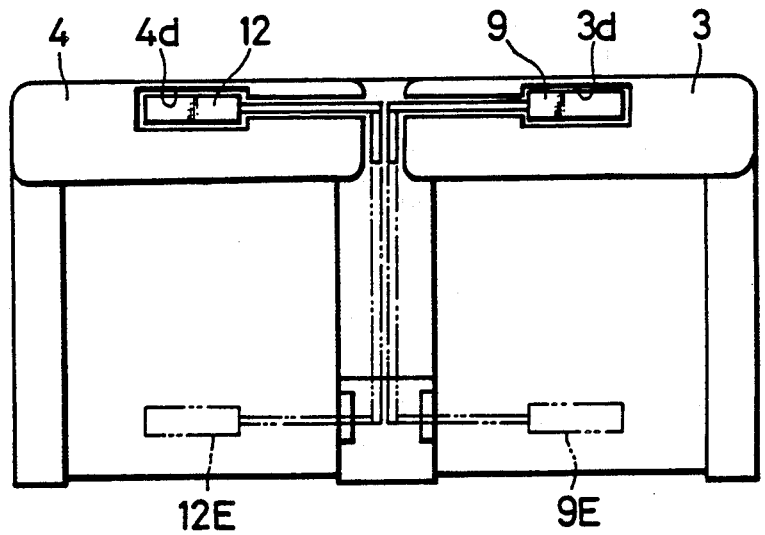
FIG. 7 is a schematic planar view of FIG. 6, and to which reference will be made in explaining advantages of the present invention.
Figure 6:
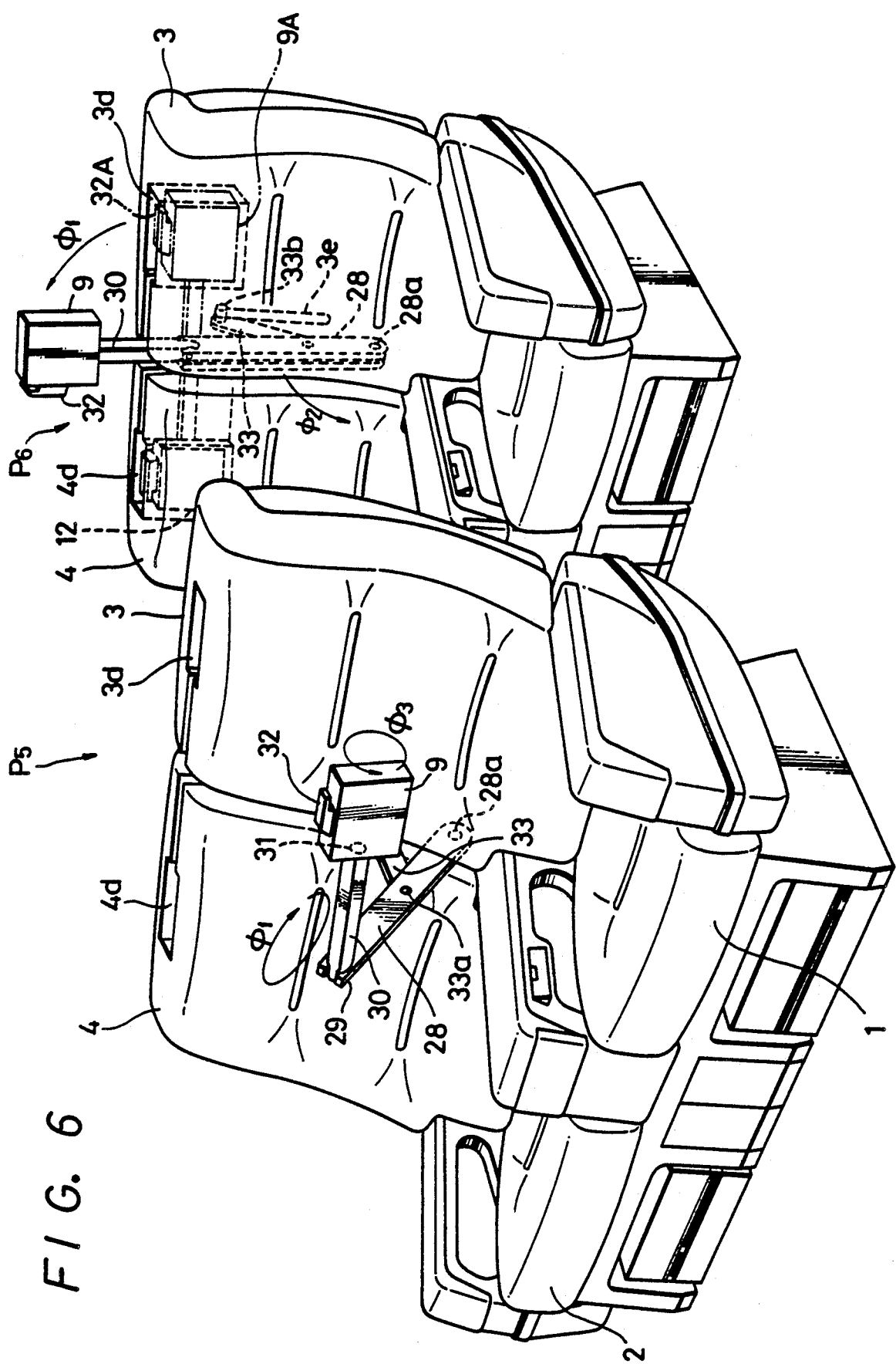
FIG. 6 is a perspective view illustrating a seat apparatus for attaching a display monitor according to a third embodiment of the present invention.

A third embodiment of the present invention will be explained with reference to FIGS. 6 and 7. In FIGS. 6 and 7, like parts corresponding to those of FIGS. 1 and 2 are marked with the same references and therefore need not be described in detail.

FIG. 6 pictorially illustrates the third embodiment of the present invention in which a pair of seat apparatus are located at positions P5 and P6, respectively. As shown in FIG. 6, an arm 28 is pivotally fixed at a first end thereof to the lower end of a side of the right seat back 3 adjacent to the left seat back 4 through a shaft 28a so that the arm 28 can rotate around the shaft 28a. A joint 30 is pivotally fixed at a first end thereof to the second end of the arm 28 through a shaft 29 so that this joint 30 can rotate around the shaft 29 in the direction shown by $\phi_1$ in FIG. 6. The display monitor 9 is pivotally fixed to the second end of the joint 30 through a shaft 31 so that the display monitor 9 can freely rotate around the shaft 31 in the direction shown by $\phi_3$ in FIG. 6. A handle 32 is fixed to one side of this display monitor 9.

A stay 33 is pivotally fixed at a first end 33a thereof to the intermediate portion of the arm 28, and a pin 33b formed at the second end of the stay 33 is inserted into a guide groove 3e formed in the side wall of the seat back 3.

A recess 3d is formed in the upper end of the seat back 3 in such a manner that the display monitor 9 is stowed within the recess 3d. When the display monitor 9 is stowed within the recess 3d at the position P6 as shown by a two-dot chain line 9A in FIG. 6, the handle 32 of the display monitor 9 is placed at the exit side of the recess 3d as shown by a two-dot chain line 32A of FIG. 6. Further, a recess 4d is similarly formed in the upper end of the seat back 4 at a position corresponding to the recess 3d of the seat back 3, and the display monitor 12 is also stowed within the recess 4d.

When the passenger takes out the display monitor 9 stowed within the recess 3d from the position shown by the two-dot chain line 9A of FIG. 6, the passenger touches the handle 32 and turns the display monitor 9 and the joint 30 in the direction shown by $\phi_1$ in FIG. 6 so that the joint 30 and the arm 28 form a straight line. Then, the passenger holds the display monitor 9 and turns the arm 28 around the shaft 28a (shown by a phantom) in the direction shown by $\phi_2$ to let the stay 33 contact with the lower end of the guide groove 3e, whereby the arm 28 is stably held. Thereafter, when the joint 30 is rotated around the shaft 29 in the direction opposite to the direction $\phi_1$, the display monitor 9 is moved to the optimum viewing position at which the passenger can watch the display screen of the display monitor 9. Further, by rotating the display monitor 9 around the shaft 31 in the direction shown by $\phi_3$ in FIG. 6, it is possible to determine the optimum viewing angle of the display monitor 9 so that the passenger can watch the display monitor 9 in the best viewing position.

According to the third embodiment of FIG. 6, when the display monitors 9 and 12 are not operated, these display monitors 9 and 12 are respectively stowed in the recesses 3d and 4d as shown in FIG. 7. Thus, the accessory apparatus provided on the adjacent seat and the arm rests of the individual passenger seats are not disturbed by these display monitors 9 and 12 at all.

Further, when the display monitors 9 and 12 are operated, they are moved as shown by two-dot chain lines 9E and 12E of FIG. 7, whereby these display monitors 9 and 12 can be located at the positions at which the passenger can watch the display monitors 9 and 12 in the best viewing position.

As set forth above, according to the present invention, the seat apparatus for attaching the display monitor is provided with an arm having a first end which is rotatably attached to the reclineable seat back, display means pivotally attached to the second end of the arm and a recess formed in the seat back for stowing therein the display means, whereby the display means can be stowed in the recess without disturbing the accessory apparatus provided on the adjacent seat and the arm rest of the passenger seat.

Further, even when the seat back of the reclining seat is reclined, the display means is maintained at the position at which the passenger can watch the display means in the best viewing position.

Furthermore, since the display means is rotated along the arm, the viewing angle of the display means is determined to be proper one in accordance with the position of the passenger.

Having described preferred embodiments of the invention in detail with reference to the accompanying drawings, it is to be understood that the present invention is not limited to those precise embodiments and that many changes and modifications could be effected by one with ordinary skill in the art without departing from the spirit and scope of the invention as defined in the appended claims.

What is claimed is:

1. A display apparatus for attachment to a seat having a seat back which reclines about a first horizontal axis, comprising:
    (a) an arm having first and second ends and being pivotally fixed at the first end to the seat back at a point located vertically above the first horizontal axis so that both the first and second ends of the arm are movable with the seat back as it reclines and the second end of the arm can be swung from a position generally alongside the seat back to a position generally in front of the seat back so as to be within the view of a viewer reclining against the seat back;
    (b) video display means;
    (c) pivot means for attaching the video display means to the second end of the arm; and
    (d) wherein a recess for stowing the video display means is formed in the seat back.

2. A display apparatus according to claim 1, wherein the pivot means has multiple degrees of freedom whereby the video display means can be positioned for optimum viewing with respect to the position of the viewer reclining against the seat back.

3. A display apparatus according to claim 2, wherein the pivot means has three freedoms of movement so that the video display means is rotatable around a first axis along the arm, a second axis perpendicular to the first axis, and a third axis perpendicular to the first and second axes.

4. A display apparatus according to claim 1, in which the arm is pivotally attached to a lower side of the seat back, and the recess is formed at an upper side of the seat back.

5. A display apparatus according to claim 1, in which the video display means is a liquid crystal display.

6. A display apparatus according to claim 1, further comprising a stay having a first end slidably connected with a side of the seat back and a second end which is pivotally attached to a point on the arm which is intermediate its first and second ends.

7. A display apparatus according to claim 6, wherein the arm is a folding arm.

8. A display apparatus according to claim 1, wherein the recess is formed in the top of the seat back.

9. A display apparatus according to claim 1, wherein the recess is formed in the side of the seat back.

10. A display apparatus according to claim 1, wherein the seat back has a head rest and the recess is formed at the top of the seat back and behind the head rest.

11. A display apparatus according to claim 1 in which the arm is a single arm.

12. A display apparatus according to claim 1 further comprising shock absorbing means surrounding the video display means on at least two sides thereof.

13. A display apparatus for attaching a separate display to each one of a pair of side-by-side seats each having a hinged seat back which reclines and with one side of one seat back opposing a side of the other seat back, comprising:
    (a) a pair of arms each having first and second ends with the first ends being pivotally fixed to the opposing sides of the seat backs, respectively, at points above the seat backs' hinges, such that the arms move with the seat backs as they recline;
    (b) a pair of video display means respectively attached to the second ends of the pair of arms; and
    (c) wherein a pair of recesses are formed in the opposing sides of the seat backs, respectively, for stowing the video display means when not in use.

14. A display apparatus according to claim 13, further comprising pivot means for pivotally attaching the pair of video display means to the respective second ends of the pair of arms.

15. A display apparatus according to claim 13, in which the pair of recesses are respectively formed in the tops of the opposing sides of the seat backs.

16. A display apparatus according to claim 13, further comprising an arm rest provided between the pair of reclining seats.

* * * * *